United States Patent Office 2,922,806
Patented Jan. 26, 1960

2,922,806

PREPARATION OF ACRYLOXYALKYL SUBSTITUTED SILOXANES

Robert L. Merker, Pittsburgh, Pa., assignor to Dow Corning Corporation, Midland, Mich., a corporation of Michigan No Drawing. Application February 1, 1957
Serial No. 637,622

8 Claims. (Cl. 260—448.2)

This invention relates to certain siloxanes having acryloxy or methacryloxy groups attached to the silicon through a divalent alkylene radical of from 2 to 4 inclusive carbon atoms.

Conventional organosiloxane resins and rubbers generally consist of polymeric units of the formula

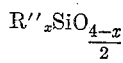

where $x$ has an average value of from about 0.8 to about 2 and R″ represents monovalent hydrocarbon radicals or halogenated derivatives thereof. Such polymers have become well known articles of commerce. One of the difficulties with these polymers has been the high temperature and long heating schedule necessary to cure them to a satisfactory degree.

It is an object of the present invention to provide a modified organosiloxane which can be set at low temperatures in a short period of time. It is a further object to produce modified organosiloxanes having novel properties, particularly having a lowered coefficient of friction. Other objects and advantages will be apparent from the following specification.

This invention specifically relates to organopolysiloxanes containing polymeric units of the formula

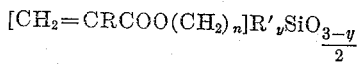

where $n$ is an integer of from 2 to 4 inclusive, $y$ is 0, R is selected from the group consisting of hydrogen and the methyl radical, and R′ is a monovalent hydrocarbon radical free of aliphatic unsaturation. These polymers can contain units within the above formula which are all alike, or which differ in values for $n$ or in the number and/or type of R′ radicals attached to the silicon atom in each polymeric unit. The invention is also inclusive of copolymers in which from 0.1 to 99.9 mol percent of the polymer units are of the above formula, and the remainder of the polymeric units are of the formula

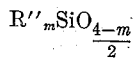

where R″ is selected from the group consisting of monovalent hydrocarbon radicals and halogenated monovalent hydrocarbon radicals and $m$ is an integer of from 0 to 3 inclusive, the average value of $m$ in said copolymer being from 0.8 to 3 inclusive. This invention is also concerned with a process for the preparation of the above described polymers and copolymers wherein $y$ is 0 or 1, or has any fractional value up to 1 in the case of copolymers.

It has been shown in my copending application No. 431,295 filed May 20, 1954, now U.S. Patent No. 2,793,-223, issued May 21, 1957, that siloxanes containing units of the formula

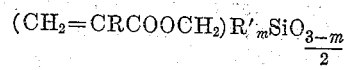

where R and R′ are as above defined and $m$ is 1 or 2, can be prepared by reacting, e.g., compounds of the formula

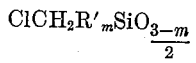

with sodium or potassium salts or acrylic or methacrylic acid. Although such siloxanes have very desirable properties, their commercial development has been somewhat curtailed by the difficulties inherent in the commercial production of the necessary halomethylsiloxane intermediates. The latter are prepared by the halogenation of the methyl radical attached to silicon, and there is a strong tendency in such a reaction toward polyhalogenation. The economical preparation of the corresponding monohaloethyl, monohalopropyl, etc. derivatives is even more difficult.

This invention can best be practiced in the following manner. A hydrogenosilane of the formula R′$_y$HSiCl$_{3-y}$ is reacted with vinyl acetate, allyl acetate, or the acetate of allylcarbinol (i.e. of 3-buten-1-ol) respectively to produce the corresponding acyloxy derivative

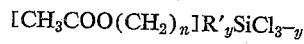

In this formula, $y$ is 0 or 1 and $n$ is 2, 3, or 4 respectively according to the number of carbon atoms in the unsaturated portion of the above acetates. Other acyloxyvinyl etc. compounds can be used if desired, but the acetates are preferred for their availability. This reaction is best carried out in the presence of chloroplatinic acid as a catalyst, preferably in amounts of from about $1 \times 10^{-6}$ to $1 \times 10^{-4}$ mol per mol of silane, at temperatures of e.g. 80° to 180° C.

R′ in the above formulas can be any monovalent hydrocarbon radical free of aliphatic unsaturation, e.g. alkyl such as methyl, ethyl, and octadecyl; aryl such as phenyl and xenyl; alkaryl or aralkyl such as tolyl or benzyl; and cycloaliphatic such as cyclohexyl. The preferred hydrogenosilanes are HSiCl$_3$, MeHSiCl$_2$, and PhHSiCl$_2$, the symbols Me and Ph being used here and throughout this specification as representing methyl and phenyl radicals respectively. If desired, the hydrogenochlorosilanes above can be replaced by the corresponding bromo- or alkoxysilanes (e.g. HSiBr$_3$ or MeHSi(OEt)$_2$ where Et is ethyl) to produce the corresponding bromo- or alkoxysilane derivatives.

The acyloxy compound (e.g. the illustrative

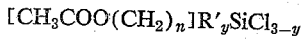

above) is then hydrolyzed to produce the corresponding siloxane. If the hydrolysis is under relatively mild conditions, only the chlorine, bromine, or alkoxy substituents attached to silicon are removed and the acyloxy radical is left intact. When $y$ is 0, this hydrolysis should be carried out in the presence of an inert organic solvent such as benzene, toluene, xylene, CCl$_4$, cyclohexane, etc., as is conventional in the art of organosilicon chemistry. When $y$ is 1, the use of an inert solvent is optional.

The siloxane so produced is then subjected to alcoholysis, for example by contacting it with methanol or ethanol at temperatures preferably in the region of 50° to 100° C., to produce the corresponding hydroxyalkyl substituted polymer having units of the formula

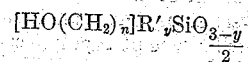

When $n$ is 2, this alcoholysis should be carried out in the presence of an alkaline catalyst, e.g., in the presence of an alkaline catalyst, e.g., in the presence of 0.1 to 2% by weight of NaOH or KOH based on the weight of the siloxane. Hence in this case any acid produced during the previous hydrolysis is best removed from the hydrolyzate (e.g. by washing it with water until neutral)

prior to the alcoholysis. When $n$ is 3 or 4, either an acidic or alkaline catalyst can be used for the alcoholysis reaction. Sulfuric acid is an excellent acidic catalyst in this step, and if the hydrolyzate is relatively neutral an amount in the region of 0.1 to 2% by weight based on the weight of the siloxane can be employed. HCl and HBr are also good acidic catalysts. Accordingly when $n$ is 3 or 4 and a chloro- or bromosilane has been used as a monomer for hydrolysis, the residual acid in the hydrolyzate can be left there for its catalytic action in the alcoholysis step. In any of the alcoholysis reactions the amount of alcohol employed can range from the theoretical amount required for the reaction to any conceivable excess. If an alkoxysilane is used as the monomer, or as one of any plurality of monomers employed for the hydrolysis, it can be seen that the required alcohol can be produced in situ as a by-product. It is also readily seen that by choosing the proper reactants, the hydrolysis and alcoholysis steps can be carried out as one step at an elevated hydrolysis temperature, adding any required catalyst or alcohol to the hydrolysis medium.

The polymer containing the $$[HO(CH_2)_n]R'_ySiO_{\frac{3-y}{2}}$$

units can then be contacted with acrylic or methacrylic acid to convert said units to $$[CH_2=CRCOO(CH_2)_n]R'_ySiO_{\frac{3-y}{2}}$$

units. The amount of the acrylic type acid employed is preferably about the theoretical amount required for the reaction, and again $H_2SO_4$ can be used in catalytic quantities (0.1 to 2% by weight based on the weight of the siloxane) to expedite the reaction. A preferred manner of operation is to carry out the reaction in the presence of an inert organic solvent which is incompatible with water, heating the reactants at the reflux temperature of the solvent while removing by-produced water by azeotropic distillation. The best results are obtained by carrying out the reaction in the presence of a polymerization inhibitor for the acrylic or methacrylic acid, such as hydroquinone.

Copolymers in accordance with this invention are of two different types, and each can be produced by several methods. The first type of copolymer is that in which the units are of different formulas, but all of them fall within the general formula $$[CH_2=CRCOO(CH_2)_n]R'_ySiO_{\frac{3-y}{2}}$$

These can be produced, for example, by employing a mixture of acrylic and methacrylic acids in the reaction described in the preceding paragraph, or by subjecting a mixture of two or more homopolymers to the action of a siloxane rearrangement catalyst. The latter should be an acidic type catalyst, and examples of these are well known in the art, with $H_2SO_4$ and/or trifluoroacetic acid being illustrative of preferred catalysts. An alternative procedure for the preparation of such copolymers is to employ a mixture of the $[CH_3COO(CH_2)_n]R'_ySiCl_{3-y}$ type compounds (i.e. each compound in the mixture having different R' radicals and/or different values for $n$ and/or $y$) for the original hydrolysis step. This cohydrolysis can be carried out in the conventional manner, producing a copolymeric hydrolyzate to which the remaining alcoholysis steps, etc., can be applied.

The second specific type of copolymer within the scope of this invention is that which contains, in addition to the defined acryloxyalkyl substituted units, units of the formula $$R''_mSiO_{\frac{4-m}{2}}$$

where R'' represents monovalent hydrocarbon radicals and/or halogenated monovalent hydrocarbon radicals and $m$ is an integer of from 0 to 3 inclusive. The R'' radicals can be the same or different radicals in any particular unit or in the whole polymeric molecule. These R'' radicals can be any of the radicals shown above as illustrative of the R' radicals, as well as alkenyl radicals such as vinyl, allyl, hexenyl, and cyclohexenyl; and halogenated monovalent hydrocarbon radicals such as chlorophenyl, dichlorophenyl, bromophenyl, tetrabromoxenyl, tetarfluoroethyl, $\alpha,\alpha,\alpha$-trifluorotolyl, 1,1,1-trifluoropropyl, and chlorovinyl radicals. The preferred units are those in which all of the R'' radicals are methyl and/or phenyl radicals, as illustrated by the radicals $MeSiO_{1.5}$, $Me_2SiO$, $Me_3SiO_{.5}$, $PhSiO_{1.5}$, $Ph_2SiO$, $MePhSiO$, $Me_2PhSiO_{.5}$, and $Ph_2MeSiO_{.5}$. These units can be present in the copolymer either singly or in any combination. One preferred embodiment of the invention is a copolymer in which both methyl and phenyl radicals are present as R'' radicals, either within any particular unit (e.g. as the unit PhMeSiO), or within the polymeric molecule as a whole (as where both $MeSiO_{1.5}$ and $PhSiO_{1.5}$ units are present). When any $SiO_2$ units are present, it is preferred that there be sufficient R'' substituted units present so that $m$ in the copolymer has an average value of at least 0.8. In other words, the average R''/Si ratio in regard to these particular units should preferably be at least 0.8:1.

There are several methods by which the copolymers discussed in the preceding paragraph can be prepared. Polymers or copolymers of the general formula $$R''_mSiO_{\frac{4-m}{2}}$$

are themselves well known, and many are commercially available. Any of the latter type polymers or copolymers which are either liquid in form or which are still soluble in an inert organic solvent can be contacted in the liquid phase with the acryloxyalkyl substituted polymers or copolymers, in the presence of acidic siloxane rearrangement catalysts as discussed above, to produce the new copolymers. The preferred method, however, is that of mixing the desired types and amounts of $R''_mSiY_{4-m}$ monomers (Y being any hydrolyzable atom or radical, e.g. Cl, Br, $-OCH_3$, $-OC_2H_5$, etc.) with the $[CH_3COO(CH_2)_n]R'_ySiCl_{3-y}$ type compounds, cohydrolyzing the mixture to obtain the acetoxyalkyl substituted copolymers, and then proceeding with the alcoholysis and acrylic or methacrylic acid reactions as before. Thus, for example, compounds such as $MeSiCl_3$, $Me_2SiCl_2$, $Me_3SiCl$, $PhSiCl_3$, $Ph_2SiCl_2$, $PhMeSiBr_2$ and $MeSi(OEt)_3$, singly or in any combination, and including $Si(OEt)_4$ if the required average value for $m$ is retained, can be cohydrolyzed with the acetoxyalkyl substituted monomers in any ratio down to 0.1 mol percent of the latter. The cohydrolysis and later steps can all be conducted in the same manner as when the acetoxyalkyl substituted silane was the only monomer employed, it being preferable to have an inert organic solvent present at all times that the average ratio of total silicon-attached organic groups to silicon atoms is less than about 1.95:1.

It is to be understood that the specific formulas given for the units contained in the siloxane polymers and copolymers of this invention represent the vast majority of the units present, but do not exclude the presence of other siloxane units containing silicon bonded substituents other than those which have been shown. Some commercial hydrolyzable organosilanes contain trace amounts of e.g. methylene or ethylene linked disilanes, or trace amounts of silicon bonded hydrogen, and the corresponding siloxane units would be incorporated into any cohydrolyzate produced from such silanes. Also it is well known that organosiloxanes often contain small amounts of unhydrolyzed substituents such as silicon bonded Cl or alkoxy groups, or up to 2–3% of uncondensed silicon bonded hydroxy radicals. Any of such substituents may be present in the compounds of this invention.

The compounds of this invention can be further polymerized by exposure to vinyl polymerizing conditions to produce resinous and elastomeric products which are useful in the many and widely known uses for which the conventional organosiloxanes have become famous, e.g. as molding and impregnating resins, electrical insulating varnishes, water repellent treatments, and thermally resistant rubbers and resins.

By "vinyl polymerizing conditions" herein is meant any of the usual conditions employed and well known in the art of organic vinylic compounds. Conventional bulk polymerization, solvent solution or suspension polymerization, and emulsion polymerization techniques are applicable. The conventional catalysts (organic, inorganic, or physical) can be used. These include heat alone, ultra violet light, ionizing radiation (e.g. X-rays and accelerated particles from nuclear reactors, radioactive isotopes, "Van de Graff generators" and the like), hydrogen peroxide, sodium peroxide, benzoyl peroxide, t-butyl peracetate, t-butyl perbenzoate, and other "free radical" generators such as α,α'-azodi-iso-butyronitrile. The organic or inorganic catalysts are usually employed in an amount of from 0.01 to 3% by weight based on the weight of the siloxane. Conventional organosiloxane polymerization catalysts, many of which are well known in the art, can also be added to expedite the condensation of any Si bonded hydroxyls present.

The compounds of this invention can also be employed to modify the properties of conventional organic vinylic compounds by copolymerization therewith. Examples of the latter include vinyl chloride, styrene, divinylbenzene, dichlorostyrene, acrylonitrile, vinyl acetate, vinylalkyl ethers, vinylidene chloride, isobutylene, isopropenyl, chloride, methyl- or ethyl methacrylate or acrylate, butadiene, chloroprene, isoprene, and linear unsaturated polyesters such as those of ethylene glycol and maleic acid. Such copolymers can be prepared by intimately contacting the reactants in the presence of the "vinyl polymerizing conditions" described above. Likewise the present compounds can be reacted with any silane or siloxane containing vinyl or allyl groups attached directly to the silicon atom.

Of the various polymers and copolymers within the scope of this invention, the most preferred (for both efficiency of preparation and outstanding properties) are those in which $n$ is 3, i.e. the acryloxy -or methacryloxy-propyl derivatives. Also, although as indicated previously a maximum of 99.9 mol percent of the $$R''_m SiO_{\frac{4-m}{2}}$$

units may be present in the copolymers, it is preferred that this be limited to a maximum of 90 mol percent.

The following examples are illustrative only.

*Example 1*

A mixture of 5 mols each of $HSiCl_3$ and allyl acetate was heated at 100° C. for 3 hours in the presence of $5 \times 10^{-5}$ mol chloroplatinic acid, and the product $$[CH_3COO(CH_2)_3]SiCl_3$$

was distilled out of the reaction mass. When a mixture containing 0.75 mol of the latter silane, 0.6 mol $Me_2SiCl_2$, 1.05 mols $PhSiCl_3$ and 0.6 mol $Ph_2SiCl_2$ is mixed with an equal weight of toluene, then hydrolyzed by adding it to a tenfold excess of water, then 1.5 mols of ethanol and 1% by weight $H_2SO_4$ based on the theoretical weight of the total organosiloxane present is added to the toluene solution of hydrolyzate and the mixture heated at reflux temperature for 3 hours, then the formed ethyl acetate and excess ethanol are distilled out, then 0.75 mol acrylic acid and 10% of its weight of hydroquinone are added and the toluene solution again heated for 3 hours while evolved water is removed from the refluxing toluene, and the reaction mass then washed with water until free of acid, there is obtained a copolymer containing 25 mol percent $$[CH_2{=}CHCOO(CH_2)_3]SiO_{1.5}$$

units, 20 mol percent $Me_2SiO$ units, 35 mol percent $$PhSiO_{1.5}$$

units, and 20 mol percent $Ph_2SiO$ units. When this procedure is repeated except that methacrylic acid is used in place of the acrylic acid, a comparable copolymer is obtained containing 25 mol percent $$[CH_2{=}CMeCOO(CH_2)_3]SiO_{1.5}$$

units in place of the acryloxypropyl siloxane units above. When either of these copolymers is mixed with 1% by weight of benzoyl peroxide based on the weight of the copolymer, and is then exposed in thin section to a temperature of 150° C. for a few moments, a resilient resinous film is produced.

*Example 2*

When a mixture of 1 mol each of $$[CH_3COO(CH_2)_3]SiCl_3$$

$PhSiCl_3$, and $PhMeSiCl_2$ is subjected to hydrolysis, alcoholysis, and reaction with acrylic or methacrylic acid by the process of Example 1, copolymers containing 33.3 mol percent each of $PhSiO_{1.5}$ units, $PhMeSiO$ units, and either $[CH_2{=}CHCOO(CH_2)_3]SiO_{1.5}$ or $$[CH_2{=}CMeCOO(CH_2)_3]SiO_{1.5}$$

units are obtained. Both of these copolymers are readily further polymerized in the presence of benzoyl peroxide or α,α'-azodi-iso-butyronitrile to a resilient resinous state.

*Example 3*

The reaction of $MeHSiCl_2$ and allyl acetate at 100° C. in the presence of chloroplatinic acid produces $$[CH_3COO(CH_2)_3]MeSiCl_2$$

(boiling point 142° C./73 mm. Hg, $n_D^{25}$ 1.4434). When the latter is subjected to hydrolysis, alcoholysis, and reaction with acrylic or methacrylic acid as in Example 1, polymers of the unit formula $$[CH_2{=}CHCOO(CH_2)_3]MeSiO$$

or $[CH_2{=}CMeCOO(CH_2)_3]MeSiO$ are obtained. Both of such polymers can be further polymerized to the resinous state by adding benzoyl peroxide thereto and heating at 100°–150° C. When 1 mol of either polymer in its toluene solution is mixed with a 50% toluene solution of 1 mol of a copolymer containing equimolar amounts of $MeSiO_{1.5}$ and $Me_2SiO$ units, along with 1% by weight of both $H_2SO_4$ and $F_3CCOOH$ based on the total weight of siloxanes, and the solution is allowed to stand at room temperature for 3 days, there is obtained a copolymer containing 25 mol percent each of $MeSiO_{1.5}$ and $Me_2SiO$ units and 50 mol percent of either the acryloxypropyl- or methacryloxypropylmethylsiloxane units respectively.

*Example 4*

When an equimolar mixture of $$[CH_3COO(CH_2)_3]MeSiCl_2$$

and $PhSiCl_3$ is subjected to the hydrolysis, alcoholysis, and acrylic or methacrylic reactions of Example 1, there is produced a copolymer containing 50 mol percent of $PhSiO_{1.5}$ units and 50 mol percent of either $$[CH_2{=}CHCOO(CH_2)_3]MeSiO$$

or $[CH_2{=}CMeCOO(CH_2)_3]MeSiO$ units respectively.

*Example 5*

Equimolar quantities of vinyl acetate and $MeHSiCl_2$ were reacted at 100° C. in the presence of chloroplatinic acid to produce $[CH_3COO(CH_2)_2]MeSiCl_2$, boiling at 117° C./62 mm. Hg, $n_D^{25}$ 1.4390. When this silane is hydrolyzed, etc., as per Example 1, polymers of the unit formula [CH$_2$=CHCOO(CH$_2$)$_2$]MeSiO or

[CH$_2$=CMeCOO(CH$_2$)$_2$]MeSiO are obtained.

Example 6

When equimolar amounts of PhHSiCl$_2$ and allyl acetate are reacted at 100° C. in the presence of chloroplatinic acid, the product obtained is

[CH$_3$COO(CH$_2$)$_3$]PhSiCl$_2$

When a mixture of 2 mols of the latter and 1 mol each of Cl$_2$C$_6$H$_3$SiCl$_3$ and F$_3$CCH$_2$CH$_2$SiCl$_3$ is subjected to the hydrolysis, alcoholysis, and acrylic or methacrylic acid reactions as in Example 1, a copolymer is obtained containing 25 mol percent each of Cl$_2$C$_6$H$_3$SiO$_{1.5}$ and F$_3$CCH$_2$CH$_2$SiO$_{1.5}$ units, and 50 mol percent of either [CH$_2$=CHCOO(CH$_2$)$_3$]PhSiO or

[CH$_2$=CMeCOO(CH$_2$)$_3$]PhSiO units.

That which is claimed is:

1. A process for the preparation of an organopolysiloxane consisting essentially of polymeric units of the formula $$[CH_2=CRCOO(CH_2)_n]R'_y SiO_{\frac{3-y}{2}}$$

where $n$ is an integer of from 2 to 4 inclusive, $y$ is an integer of from 0 to 1 inclusive, R is selected from the group consisting of hydrogen and the methyl radical, and R' is a monovalent hydrocarbon radical free of aliphatic unsaturation, which comprises reacting (1) a solution of a siloxane polymer consisting essentially of units of the formula $$[HO(CH_2)_n]R'_y SiO_{\frac{3-y}{2}}$$

where R', $n$, and $y$ are as above defined, in an inert water-incompatible organic solvent, with (2) an unsaturated acid selected from the group consisting of methacrylic acid and acrylic acid, by contacting (1) and (2) in a liquid phase and removing the evolved water.

2. A process for the preparation of an organopolysiloxane consisting essentially of polymeric units of the formula $$[CH_2=CRCOO(CH_2)_n]R'_y SiO_{\frac{3-y}{2}}$$

where $n$ is an integer of from 2 to 4 inclusive, $y$ is an integer of from 0 to 1 inclusive, R is selected from the group consisting of hydrogen and the methyl radical, and R' is a monovalent hydrocarbon radical free of aliphatic unsaturation, which comprises mixing in the liquid phase (1) a solution of a siloxane polymer consisting essentially of units of the formula $$[HO(CH_2)_n]R'_y SiO_{\frac{3-y}{2}}$$

where R', $n$, and $y$ are as above defined, in an inert water-incompatible organic solvent, with (2) an unsaturated acid selected from the group consisting of methacrylic acid and acrylic acid, heating the resulting mixture at the reflux temperature of the solvent in the presence of a polymerization inhibitor for (2), and removing the evolved water by azeotropic distillation.

3. A process for the preparation of an organopolysiloxane consisting essentially of units of the formula $$[CH_2=CRCOO(CH_2)_3](CH_3)_y SiO_{\frac{3-y}{2}}$$

where R is selected from the group consisting of hydrogen and the methyl radical and $y$ is an integer from 0 to 1 inclusive, which comprises reacting (1) a solution of a siloxane polymer consisting essentially of units of the formula $$[HO(CH_2)_3](CH_3)_y SiO_{\frac{3-y}{2}}$$

where $y$ is as above defined, in an inert water-incompatible organic solvent with (2) an unsaturated acid selected from the group consisting of methacrylic acid and acrylic acid, by mixing (1) and (2), heating the resulting mixture at the reflux temperature of the solvent in the presence of a polymerization inhibitor for (2), and removing the evolved water by azeotropic distillation.

4. A process for the preparation of an acryloxyalkyl substituted copolymeric organosiloxane which comprises reacting (1) a solution of a copolymeric siloxane consisting essentially of from 10 to 90 inclusive mol percent of units of the formula $$[HO(CH_2)_n]R'_y SiO_{\frac{3-y}{2}}$$

where R' is a monovalent hydrocarbon radical free of aliphatic unsaturation, $y$ is an integer of from 0 to 1 inclusive and $n$ is an integer of from 2–4 inclusive, the remaining copolymeric units being of the formula $$R''_m SiO_{\frac{4-m}{2}}$$

where R'' is selected from the group consisting of monovalent hydrocarbon radicals and halogenated monovalent hydrocarbon radicals and $m$ is an integer of from 0 to 3 inclusive, the average value of $m$ in said copolymer being from 0.8 to 3 inclusive, in an inert water-incompatible organic solvent, with (2) an unsaturated acid selected from the group consisting of methacrylic acid and acrylic acid, by contacting (1) and (2) in a liquid phase and removing the evolved water.

5. A process in accordance with claim 4 wherein (1) and (2) are mixed in a liquid phase, the resulting mixture is heated at the reflux temperature of the solvent, and the evolved water is removed by azeotropic distillation.

6. A process for the preparation of an acryloxyalkyl substituted copolymeric siloxane which comprises reacting (1) a solution of a copolymeric siloxane consisting essentially of from 10 to 90 inclusive mol percent of units of the formula $$[HO(CH_2)_3](CH_3)_y SiO_{\frac{3-y}{2}}$$

where $y$ is an integer from 0 to 1 inclusive, the remaining copolymeric units being of the formula $$(CH_3)_m(C_6H_5)_z SiO_{\frac{4-m-z}{2}}$$

where each $m$ and $z$ is an integer of from 0 to 3 inclusive, the sum of $m+z$ being no greater than 3 and the average value of the sum of $m+z$ in said copolymeric siloxane being from 0.8 to 3 inclusive, in an inert water-incompatible organic solvent, with (2) an unsaturated acid selected from the group consisting of methacrylic acid and acrylic acid, by mixing (1) and (2) in a liquid phase, heating the resulting mixture at the reflux temperature of the solvent, and removing the evolved water by azeotropic distillation.

7. A process for the preparation of an acryloxyalkyl substituted copolymeric organosiloxane which comprises the steps (1) mixing (A) at least one hydrolyzable silane of the formula R''$_m$SiY$_{4-m}$ where each R'' is selected from the group consisting of monovalent hydrocarbon radicals and halogenated monovalent hydrocarbon radicals, Y is selected from the group consisting of chlorine and bromine atoms and hydrolyzable alkoxy radicals, and $m$ is an integer from 0 to 3 inclusive and has an average value of at least 0.8, with (B) an acetoxyalkyl substituted silane of the formula

[CH$_3$COO(CH$_2$)$_n$]R'$_y$SiY$_{3-y}$ where R' is a monovalent hydrocarbon radical free of aliphatic unsaturation, Y is selected from the group consisting of chlorine and bromine atoms and hydrolyzable alkoxy radicals, $n$ is an integer of from 2 to 4 inclusive, and $y$ is an integer of from 0 to 1 inclusive, in proportion such that there is from 10 to 90 inclusive mol percent of (B) in the mixture, (2) hydrolyzing the resulting mixture with an amount of water at least sufficient to hydrolyze all of the Y substituents in the mixture, (3) converting the acetoxyalkyl substituents in the resulting organosiloxane copolymer to hydroxyalkyl substituents by an alcoholysis reaction, (4) contacting, in a liquid phase, a solution of the resulting hydroxyalkyl substituted organosiloxane copolymer in an inert water-incompatible organic solvent with an unsaturated acid selected from the group consisting of methacrylic acid and acrylic acid, and (5) removing the evolved water.

8. A process in accordance with claim 7 wherein step (4) is carried out at the reflux temperature of the solvent and in the presence of a polymerization inhibitor for the unsaturated acid, and step (5) is carried out by an azeotropic distillation.

References Cited in the file of this patent

UNITED STATES PATENTS

| | | |
|---|---|---|
| 2,723,987 | Speier | Nov. 15, 1955 |
| 2,770,633 | Sommer | Nov. 13, 1956 |
| 2,793,223 | Merker | May 21, 1957 |
| 2,823,218 | Speier et al. | Feb. 11, 1958 |

FOREIGN PATENTS

| | | |
|---|---|---|
| 1,117,542 | France | Feb. 27, 1956 |